Inventors
Robert H. Shannon
Harold E. Williamson
By their attorneys
Howson and Howson

United States Patent Office 3,061,533
Patented Oct. 30, 1962

3,061,533
CONTROL MEANS FOR A BOILING WATER
NUCLEAR REACTOR POWER SYSTEM
Robert H. Shannon, West Chester, Pa., and Harold E. Williamson, San Jose, Calif., assignors to United Engineers & Constructors Inc., Philadelphia, Pa., a corporation of Delaware
Filed May 12, 1958, Ser. No. 734,780
1 Claim. (Cl. 204—193.2)

This invention relates to a boiling water type nuclear reactor power system and in particular to a boiling water nuclear reactor power system having improved means of control.

In recent years much work has been done in developing systems for utilizing nuclear reactors to generate power. One such system is the so-called "boiling water" reactor. In a "boiling water" reactor, water is vaporized in the reactor and the steam generated is delivered directly to a turbine or other heat engine for conversion to mechanical energy. It is thus distinguished from a "pressurized water" reactor system, in which water under sufficient pressure to prevent substantial vaporization, is sent through the reactor where it is heated, and then the heat is transferred to a secondary coolant which in turn is used as the working fluid in a heat engine. By dispensing with a secondary coolant a "boiling water" system provides a potentially simpler, less bulky and more economical plant.

Although the relative simplicity of boiling water reactors, with other inherent qualities, makes them of great potential interest, some problems exist in the control of such reactors.

In a discussion of the control of nuclear reactors the terms "multiplication factor" ($k$) and "reactivity" ($\rho$) are often used. The multiplication factor is the ratio of the number of neutrons in one generation to the number in a preceding generation. Since the number of neutrons produced per unit time is a measure of the power output of the reactor, a multiplication factor in excess of 1 means that the power output of the reactor is increasing and a multiplication factor of less than 1 means the power ouput is decreasing. A multiplication factor of unity means the output is constant.

Reactivity is related to multiplication factor as follows:

$$\rho = 1 - \frac{1}{k}$$

Thus for steady state operation, $\rho$ is 0.

The reactivity of a boiling water reactor is a function of the density of the moderator (which in this case is also a coolant), the temperature (enthalpy) of the moderator-coolant and the proportions of steam (or other vapor) voids in the reactor core. Specifically, reactivity is an inverse function of the proportion of steam voids in the reactor core.

Conventionally, the reactivity of a power reactor is changed in response to load changes by movement of the control rods. Thus, in response to an increase in load the control rods are withdrawn and in response to a decrease in load are inserted. This control is perfectly adequate for slow changes in load. Thus for example, for a gradual increase in load, the control rods are withdrawn slightly to a new position corresponding to the new load position.

In conventional systems, if a rapid change in load occurs, the control rods must be rapidly withdrawn to a position beyond that corresponding to the new power level, in order to build up the neutron population rapidly. Theoretically when the new level is reached the control rods can then be inserted to the position corresponding to zero reactivity at the new power level.

However, because of instrument limitations, the rods come to their new steady state position through a series of diminishing oscillations. This tends to result in reactor system instability. Moreover, safety considerations limit the speed at which the rods may be moved, tending to give a sluggish response which may in turn also lead to reactor system instability.

Thus there is need, in operating a boiling water system for a method for rapidly increasing the reactivity, and thus raising the power level, of the reactor in response to a sudden increase in demand on the system. It is also desirable to provide means for avoiding excessive steam pressures under conditions of rapid decrease in demand.

In the normal boiling water reactor power system, preheated feed water is delivered to the reactor and in the reactor it is partially or wholly converted to steam. The steam emanating from the reactor is delivered to a turbine or other heat engine for conversion to mechanical power. The power system may be of the forced or natural recirculation type or it may be a so-called "once-through" system.

In natural or forced recirculated systems, the feed water is not wholly converted to steam and the mixture of steam and water coming from the reactor is sent to a steam drum whence steam is delivered to the heat engine. In the once-through system all the feed water is converted to "vapor" at supercritical pressure and the vapor is sent directly to the heat engine, without an intermediate steam drum.

The exhaust steam from the turbine is condensed and recirculated with fresh makeup water, if necessary, through a feed water heater and returned to a steam drum or sent directly to the reactor.

In prior systems provision for minor increases in load have been provided through a normally open by-pass around the turbine. In the normal operation of such systems about 5% of the steam generated is shunted through this by-pass. As the load increases, some of this by-pass steam is sent directly through the turbine and at the same time the control rods in the reactor are operated to raise its power level and thus return the system to the normal 5% by-pass. In the same conventional system a sudden loss of load shuts down the turbine and by-passes all the steam around the turbine.

It is obvious that the arrangement described above, while satisfactory for experimental purposes, leaves much to be desired for practical operation. It demands a continuous dumping of about 5% of reactor output. This is wasteful and cannot be afforded; particularly when it is considered that the utility of a nuclear reactor must be measured against more economical fossil fuel power units.

It is an object of the present invention to provide a simple, straight forward means for increasing the power output of a boiling water type nuclear reactor power system in response to sudden increases in load without rendering the system unstable.

It is another object of the invention to provide control means for a boiling water nuclear reactor power system which will increase the power of the reactor in direct response to a sudden or rapid increase in load and will prevent damage to the system in case of a rapid decrease in load.

It is another object of the invention to provide control means of the type described which will function without loss of valuable steam under normal conditions.

In accordance with the invention, these and other objects are met by the provision, in a boiling water nuclear reactor power system, wherein a working fluid is at least partially vaporized in a nuclear reactor and the vapor is delivered to a heat engine, of means for decreasing the temperature of the fluid supplied to the reactor and means for operating the temperature decreasing means in response to a rapid increase in load on the heat engine.

In a preferred embodiment of the invention means are also provided responsive to a rapid decrease in load on the heat engine for by-passing some of the product vapor around the turbine.

The word "rapid" as used above, and elsewhere in this application in connection with changing load or demand, means an increase, or decrease in load or demand of sufficiently high rate that it cannot be compensated for by conventional control rod movement without unacceptable oscillations of the control rods and instability of the system. The numerical value which divides a rapid change from one which is not rapid will depend on the characteristics of the particular system and will vary with various design parameters including rod worth, maximum safe rate of withdrawal in the cold condition, system energy storage capacity, fuel element response time, core composition and mode of circulation. Most reactors, however, will be able to handle adequately, by control rod movement, changes in load on the order of 0.5 to 2%/sec. Thus the type of rapid changes which the present invention is particularly designed to overcome are generally in excess of 0.5% of load per second, although depending on the particular system, the invention may not be required to be brought into operation until the load change is somewhat in excess of this rate.

In a specific preferred embodiment of the invention, the temperature of the feed-water is lowered by providing means whereby in response to a rapid increase in load, the feed water is shunted around the heaters through which it is normally passed prior to being charged to the reactor. In this way the feed water which would normally enter the reactor at say 350° F. to 400° F. for 1000 p.s.i. operating pressure is lowered in temperature to as low as 100° F. It will be understood that the precise temperature changes depend on the operating pressure and other variables of the specific unit in question.

The reactivity of a boiling water reactor is a function of the density of the moderator-coolant and therefore of the water temperature (enthalpy) and proportion of steam voids in the reactor core.

Thus, when in the novel system, cooler water is delivered to the reactor, the reactivity increases. This increase is caused directly by the lower temperature (enthalpy) causing a decrease in the proportion of steam voids in the reactor.

In a further preferred feature of the invention a by-pass is provided around the turbine. This is normally closed. Under conditions of rapidly decreasing demand, means are provided for opening the by-pass to a degree dependent on the rate of load decrease, thus preventing the turbine from running away.

In accordance with the invention, as the reactivity of the reactor is increased by diminishing the temperature of the feed water, or as the steam output is dumped, the control rods are operated to bring the reactor permanently to the desired output level.

The feed water shunt valve or turbine by-pass valve will remain opened until the control rods are automatically positioned to establish the new output level. As this new position is approached the valve starts to close so that when the reactivity of the reactor has stabilized as the new output level, by virtue of the control rod movement, the feed water shunt valve or turbine by-pass valve will have closed.

The particular type of boiling water reactor and the design of the reactor are not a part of the present invention. The reactor may, for example, use natural or enriched uranium; $D_2O$, graphite, $H_2O$, etc. as a moderator; $D_2O$ or $H_2O$ as a coolant. The reactor must, of course, be self-regulating, i.e. have negative temperature and void coefficients of reactivity. The system may be of the natural recirculation type, the forced recirculation type or of a once-through design. The steam or other vapor may be furnished to a turbine driving a generator, to a reciprocating steam engine or to any other engine designed to convert the heat energy of the steam or vapor into mechanical or electrical power.

The invention will be further described with reference to the accompanying drawings in which:

FIG. 1A is a fragmentary view of a portion of the system of FIG. 1, modified to show a natural recirculation system.

Figure 1:
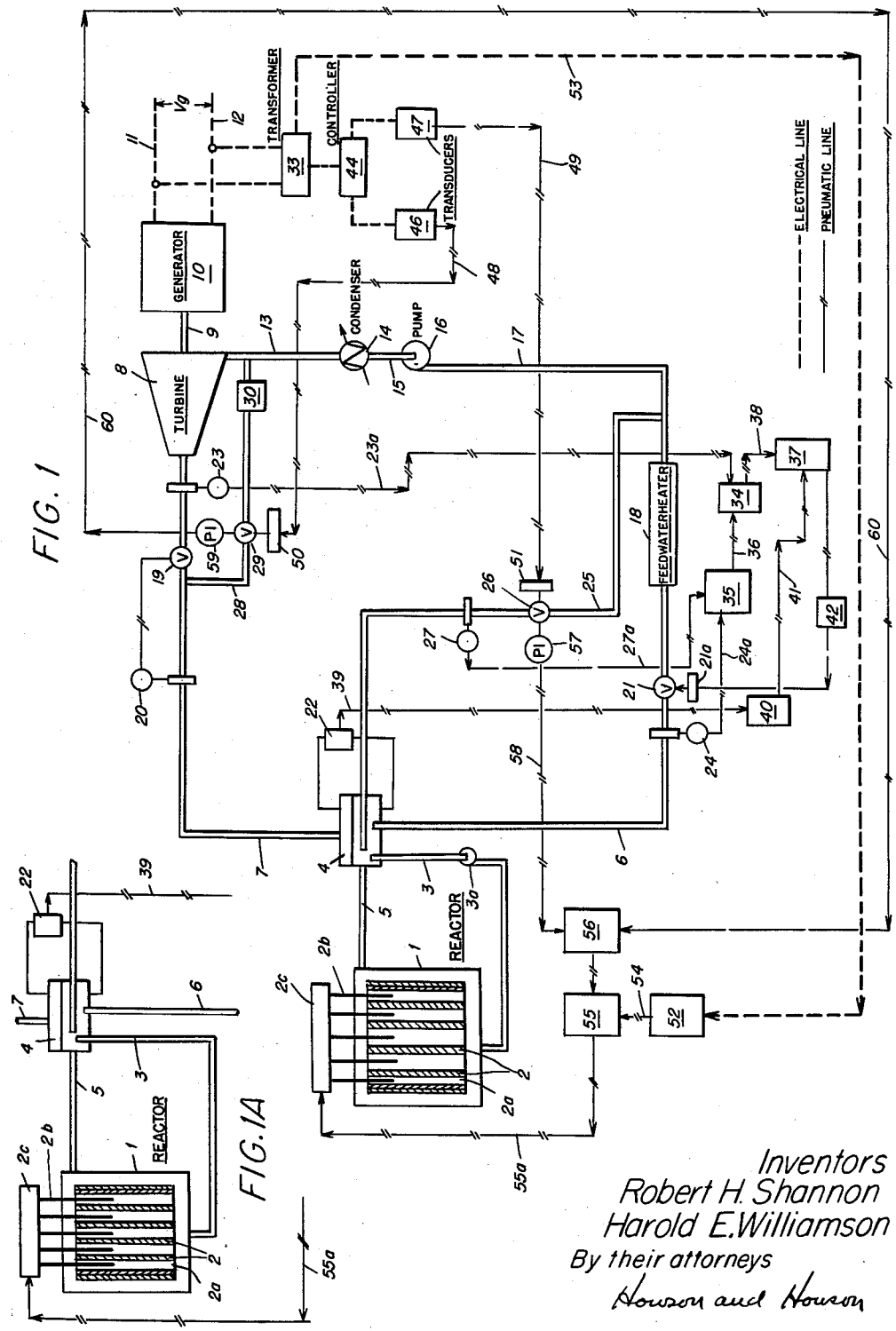
FIG. 1 is a schematic diagram of a forced recirculation boiling water nuclear reactor power system according to the invention.

Referring first to FIG. 1, a power system according to the invention comprises a reactor 1 which may be of any suitable design and which will include a mass of fissionable material 2 and a series of heating tubes such as 2a through the fissionable material.

Neutron absorption control rods (2b) are inserted in a number of these heating tubes and may be moved in or out as desired to decrease or increase the reactivity of the reactor. A pneumatically activated control rod operator 2c of conventional design is provided for moving the rods. A line 3 and pump 3a are furnished for conveying water from a steam drum 4 to the reactor. Line 5 returns steam and water to the steam drum 4. Fresh feed water is normally supplied to the steam drum 4 through a line 6. A line 7 is provided for conveying steam from the drum 4 to a turbine 8. The turbine is arranged on a shaft 9 with a generator 10 which in operation delivers a voltage Vg across the transmission lines 11 and 12. Exhaust steam from the turbine 8 is removed through a line 13 and delivered to a condenser 14. Water from the condenser 14 is conveyed through a line 15 to a pump 16. A line 17 is provided for conveying water from the pump 16 to a series of feed water heaters 18. The heaters 18 are normally regenerative heaters operated on steam drawn directly from the turbine 8. Details of this arrangement are not shown in FIG. 1. Obviously any other convenient source of heat may be used for the heaters 18. The line 6 conveys heated feed water from the heaters 18 through a valve 21 to the steam drum 4 as indicated above. Valve 21 is operated by a valve positioner 21a.

A valve 19 is provided in the line 7. It is operated via a pressure control 20 so that if the pressure in line 7 rises the valve 19 will be opened.

In accordance with the invention a line 25 having a valve 26 is provided extending from the line 17 upstream of the feed water heater 18 to the steam drum 4 at a point just above the opening of the line 3 into the drum. Alternatively, the line 25 can be connected directly to the line 3 outside the drum 4. This is not shown.

Another line 28 having a valve 29 is provided between the line 7 leading to the turbine 8 and the line 13 which carries exhaust steam from the turbine. A desuperheater 30 is provided in line 29.

It will be seen that the opening of valve 26 will permit water to be shunted around preheater 18. Similarly, opening of valve 29 will permit steam to be shunted around the turbine 8. To control these valves a modification of the familiar 3-element Bailey control system is employed.

In the conventional Bailey 3-element boiler control system, familiar to the art from long use with coal and oil fired heating systems, the rate of flow of product steam is measured and is balanced against the rate of flow of feed water to the steam drum. The liquid level in the steam drum is also measured. Thus, for example, with an increase in the amount of steam produced, more feed water is allowed to flow into the system, with the level control preventing flooding or drying up of the steam drum.

Referring again to FIG. 1, the basic elements of a conventional Bailey system are used in the present system. The rate of steam flow through line 7 is measured by a flow meter 23 and transmitted via pneumatic line 23a to a control device 34. The rate of feed water delivery to the reactor is also measured. Here, however, modification must be made in the conventional arrangement because there are two possible feed water lines, 6 and 25. The flow rate through line 6 is measured by a flowmeter 24. It is transmitted via pneumatic line 24a to a totalizing relay 35. The flow rate through line 25 is measured by flow-meter 27 and transmitted to the totalizing relay 35 via pneumatic line 27a.

The totalizing relay 35 functions to add algebraically signals from flowmeters 24 and 27 and transmit a pneumatic signal, via line 36, to the control device 34. A suitable instrument for this service, i.e. for totalizing relay 35, is Moore Products Co. Model 68–1, made by Moore Products Co., of Philadelphia, Pa.

The device 34 compares the signals from flowmeter 23 and totalizing relay 35. Under normal conditions there will be a definite relation between the feed water charged through line 6 and 25 and the steam sent through line 7. The device 34 signals departures from this normal relation. A suitable instrument for this purpose is the Bailey "Pilotrol" (Spec. 99–6) manufactured by the Bailey Meter Company, Cleveland, Ohio. The signal from control device 34 is sent to a master control 37 through pneumatic line 38.

The level of feed water in feed drum 4 is measured by a liquid level measuring device 22. This may be of any conventional type, e.g. a float instrument such as Bailey Spec. 731–1 or –2 or bell or bellows type devices well known to the art. A pneumatic signal indicative of the liquid level in the steam drum is sent through line 39 to a control device 40. The device 40 compares the signal from the measuring device 22 with a standard and sends out a pneumatic signal indicative of the departure of the liquid level from normal. The device 40 may be a Pilotrol of the same type as that used for the device 34. The signal from device 40 is sent to master control 37, through line 41.

In the master control 37, the signal from control device 34 is modified by the signal from control device 40 and the resulting modified signal is sent via line 43 to the positioner 21a of valve 21 controlling the feed water rate through line 6, to bring the rate of feed water supplied into balance with the steam output as modified by the liquid level in the steam drum.

A selector 42 is provided in line 43 to permit manual operation of the valve 21, if desired.

The master control device 37 is preferably a "Standatrol" unit manufactured by the Bailey Instrument Co. The selector may be of any conventional design. A suitable type is also sold by the Bailey Instrument Co. for use in their feed water control systems.

The system so far described, except for having two feed water rate signals, is a conventional Bailey three element boiler control system.

In accordance with the invention this system is further modified by means for controlling the valves 26 and 29 in lines 25 and 28 in response to rapid changes in load.

To effect this modification, an instrument transformer 33 is applied across the lines 11 and 12 leading from the generator 10. The output voltage of the instrument transformer 33 (on the order of say 0.250 volt) is delivered to a controller 44. The controller 44 functions to give an electric signal which is proportional to the first derivative (with time) of the signal received and thus proportional to the rate of change of the generator voltage, $Vg$. Suitable instruments for this service are available on the open market. One such instrument is Swartwout "Autronic" Model A 8C/4 manufactured by the Swartwout Co. of Cleveland, Ohio.

The controller 44 is set so that under normal conditions, i.e. with no substantial change in $Vg$ or with very slow changes, it will transmit a normal signal of say 6 milliamperes. The instrument is adjusted so that with load changes and therefore, changes of $Vg$ of say ±1%/sec., its output will depart from normal by a small amount, say ±0.5 ma.

The signal from controller 44 is transmitted to two converters or transducers 46 and 47. These elements function to give pneumatic signals which are proportional to the departure of the electrical signal from the controller 44 from normal. It is preferred to set these transducers so that they will only react when the departure of the signal from controller 44 has exceeded a predetermined tolerance range. Assume, for example, that variations in generator load of ±1%/sec. can adequately be handled by control rod movement and the normal 3-element system. The controller 44, as noted above, may be set to give, for example, a ±0.5 ma. variation in normal output for this variation in $Vg$. Transducers 46 and 47 are then set so that they will send a pneumatic signal only when the variation in their input exceeds this ±0.5 ma. range. The transducers are standard pieces of equipment, such as Swartwout Autronic P2R Power Relays.

Transducer 47 is set in reverse so that a decrease in the signal from the controller 44 below the tolerance range gives an increase in the pneumatic signal output. Transducer 46 gives a pneumatic signal proportional to the increase in the electrical signal from controller 44 above the tolerance range. The pneumatic signals from transducers 46 and 47 are carried via lines 48 and 49, respectively, to valve positioners 50 and 51, respectively. These valve positioners are again of conventional construction. Suitable devices for this service are made by the Moore Products Company (Series 711, 721 or 73). Valve positioner 50 operates valve 29 in line 28 and valve positioner 51 operates valve 26 in line 25. The transducers 46 and 47, positioners 50 and 51 and valves 29 and 26 are adjusted so that, for example, a 5.5 ma. or higher signal to transducer 47 leaves valve 26 closed and, for example, a 4.0 ma. or lower signal opens valve 26 fully; and so that, for example, a 6.5 ma. signal to transducer 46 leaves valve 29 fully closed and an 8.0 ma. signal opens valve 29 fully.

The system also comprises cooperating means for moving the control rods 2b. Thus the signal taken from transformer 33, which is proportional to $Vg$, is transmitted to a transducer 52 via a line 53. Transducer 52 (which may be for example, Swartwout Autronic A 8C/4) converts the electrical signal into a pneumatic signal corresponding to $Vg$. This signal is sent via a line 54 to a totalizer 55.

Totalizer 55 ialso receives a signal from a primary totalizing relay 56. The value of the signal from relay 56 is determined by which of valves 29 and 26 are open, if either, and the extent to which it is open. Thus, valve 26 has a pneumatic position indicator 57 connected thereto, which gives a pneumatic signal proportional to the extent to which the valve is opened. This signal is transmitted to relay 56 via a line 58.

In like manner, valve 29 has an indicator 59 attached thereto. The resulting signal, proportional to the degree of opening of valve 29, is transmitted to relay 56 via line 60.

Primary totalizing relay 56 and totalizer 55 may both be Moore Products Model 68 or equivalent units. The position indicators 57 and 59 may be Moore Valve Position Transmitters (Moore Products Company).

Totalizer 55 sends a signal to the control rod operator 2c through pneumatic line 55a. A standard value is established at which operator 2c retains the rods at their established position. If the signal falls below the standard value the rods are withdrawn; if it exceeds the standard, the rods are inserted. The value of the signal transmitted from totalizer 55 is in turn a function of the signals from totalizing relay 56 and transducer 52, as will be explained more fully below.

In operation, at normal load, valves 26 and 29 are closed. Gradual, i.e. non-rapid, changes are accommodated by the 3-element control system which functions as it does in coal or oil fired systems and by the control rods automatically resetting.

Automatic resetting of the control rods in response to gradual changes in load is accomplished through totalizer 55. Thus, if Vg is normal, the signal received by totalizer 55 from transducer 52 is normal, as is the signal from relay 56. The total signal transmitted to the controller 2C from totalizer 55 is conveniently the sum of the signals received from transducer 52 and relay 56 less a standard value and as pointed out, the operator 2C is arranged to move the control rods in one direction or the other depending on the direction and degree of deviation of the signal it receives from this standard value.

Thus, assume that normally, i.e., when Vg is at normal value, the signal from transducers 52 and relay 56 are each 7.5 lbs. The signal transmitted to operator 2C would then conveniently be (transducer 52+relay 56−standard) or
( 7.5 + 7.5 − 7.5 )=7.5 lbs.

and the normal value at which the control rods would remain unmoved would be made 7.5 lbs. If now a slow decrease in Vg is encountered, the signal from transducer 52 will fall off so that the signal transmitted to the operator 2C will be less than 7.5 lbs. The control rods will then be withdrawn to increase the output to the desired level.

In the above case it will be noted that the signal from relay 56 remains constant since the change is a slow or gradual one and operation of valves 26 and 29 is not involved.

For slow load changes, less than say 1%/sec., the signal from controller 44 does not vary more than ±5 ma. (or whatever other range has been decided upon); hence the signal to transducers 47 and 48 does not fall below 5.5 ma. nor rise above 6.5 ma. and valves 26 and 29 are not opened. The signal from totalizing relay 56 to totalizer 55 is therefore unchanged.

Assume now that a sudden increase in load is applied to the generator 10. As a result the voltage Vg falls rapidly i.e., at a rate greater than 1%/sec. A signal less than 5.5 ma. is accordingly sent to transducers 46 and 47. Transducer 46, being sensitive only to signals above 6.5 ma. is not affected. Transducer 47 sends a pneumatic signal proportional to the decrease (below 5.5 ma.) of the signal from controller 44, to valve positioner 51. Valve 26 is accordingly opened, to an extent proportional to the departure of the signal from transducer 47 below the lower limit of the tolerance range, permitting a certain amount of feed water to by-pass heaters 18 and lowering the temperature of the water supplied to the reactor. The reactivity of the reactor is thus increased, raising the power level of the reactor and producing more steam.

As the valve 26 opens, it causes a signal to be sent from position indicator 57 to relay 56. The relay 56 is arranged so that this signal is subtracted from the normal signal of say 7.5 lbs. The diminished signal is sent to totalizer 55 decreasing the signal sent to operator 2C and causing the rods to be further withdrawn.

As the output from generator 10 rises, the rate of decrease of Vg will fall. The signal from controller 44 will accordingly be raised to the normal 6 ma. No signal will be given by either transducer 46 or 47 and the valve 26 will be permitted to close. With the valve 26 closed the feed water temperature returns to normal, and the reactor is in steady state operation at the new power level with the control rods in a new position corresponding to the new level.

It should be pointed out, that under the increasing load condition described above, when valve 26 is opened, the flow rate through line 25 was increased above its normal zero value. This increased the signal from relay 35 to control device 34 and caused closing of valve 21. However, as the steam rate through line 7 increased in response to the increasing output of the reactor, the valve 21 opened, to balance this increasing output rate, as well as to compensate for the reclosing of valve 26 because of the return of Vg to its normal value. With valve 26 completely reclosed, valve 21 assumes a position which will allow more feed water to be supplied than had previously been the case, to compensate for the increased output of the reactor.

If now the load on generator 10 should suddenly decrease, the voltage Vg will increase, increasing the signal to transducers 46 and 47 to above 6.5 ma. The transducer 47 is not affected since it is only responsive to signals below 5.5 ma. The transducer 46 sends a pneumatic signal via a line 48 to the valve positioner 50 causing the valve 29 to open to an extent which is proportional to the amount by which the signal from controller 44 exceeds 6.5 ma. When the valve 29 opens, steam from line 7 is permitted to flow through line 28. It is desuperheated at 30 and then dumped into line 13. This slows the turbine to match the demand on the generator.

As the valve 29 opens, it also causes a signal to be sent from position indicator 57 to relay 56. The relay 56 is arranged to add this signal to the normal 7.5 lbs. The augmented signal is transmitted to totalizer 55, increasing the signal sent to operator 2C and causing the control rods to be inserted.

As the generator output meets its demand, the signal from controller 44 will approach the standard 6.5 ma. Once it has fallen below 6.5 ma., the valve 29 closes, shutting off the by-pass through line 28. In the meantime the steam delivered through line 7, as indicated on flow meter 23, will have fallen off. This is reported to the control device 34 and the normal 3-element control system operates to reduce the amount of feed water supplied to the reactor.

As noted, in FIG. 1 the invention is shown applied to a forced recirculation system. As indicated in FIG. 1A the invention may also be used with a natural recirculation system. The sole distinction between the system shown in FIGS. 1 and 1A is that in FIG. 1 the recirculation pump 3a is provided in the line 3. It is believed that the operation of the system of FIG. 1A will be obvious from the foregoing description.

Figure 2:
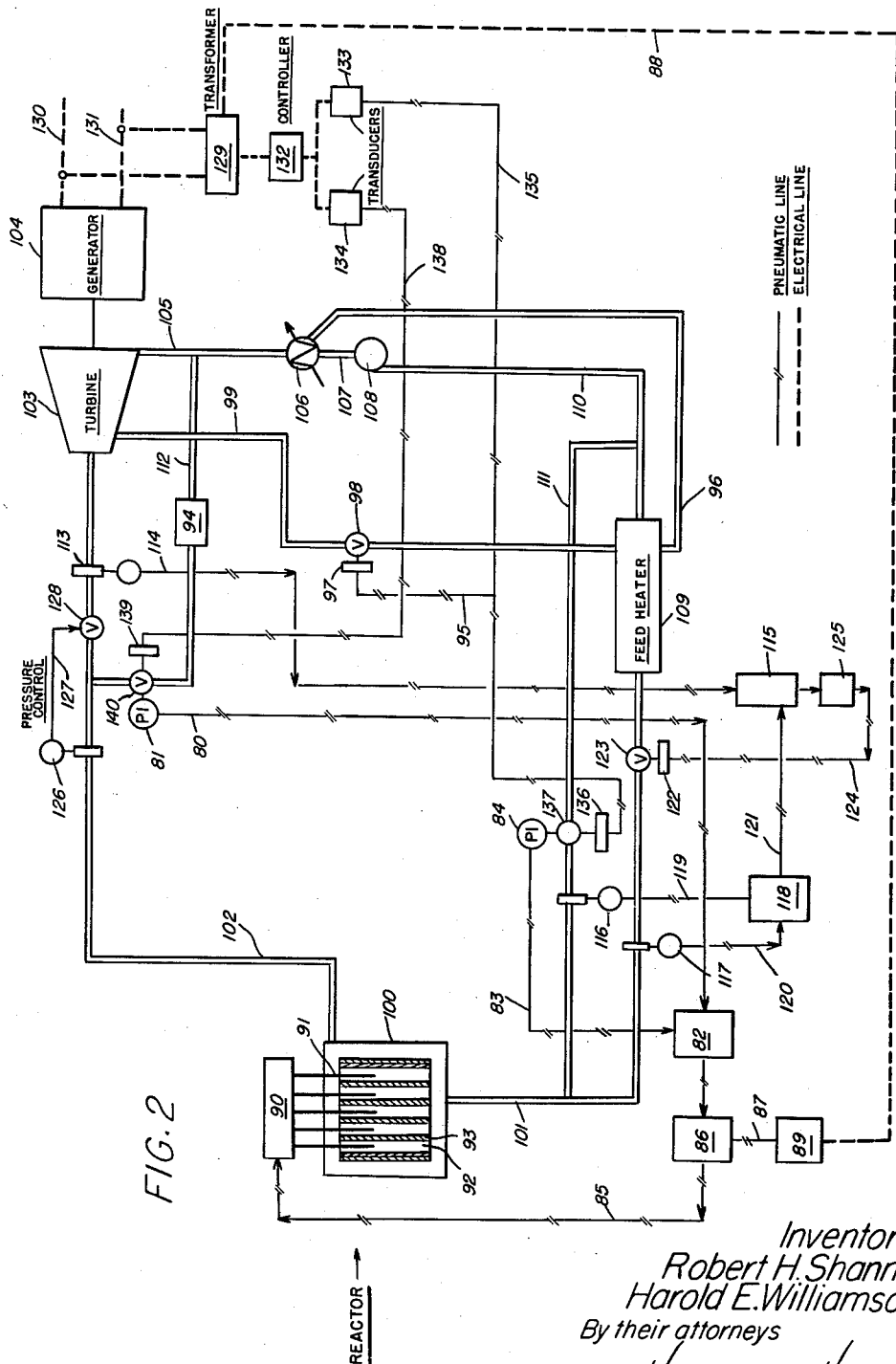
FIG. 2 is a schematic diagram of a once-through boiling water nuclear reactor power system according to the invention.

FIG. 2 shows the application of the invention to a once-through super-critical system. In FIG. 2 water is supplied to a reactor 100 via a line 101. The reactor comprises a mass of fissionable material 93 and heating tubes 92. Control rods 91 operated by a pneumatically actuated operator 90 are also provided. In the reactor the water is entirely converted to "vapor," in the super-critical region. This vapor is removed through line 102 and delivered to a turbine 103, which drives a generator 104. Exhaust vapor from turbine 103 is removed via line 105 and delivered to a condenser 106. Condensate is removed from condenser 106 through line 107 by pump 108 and delivered to feed water heaters 109 via line 110.

The feed water heaters 109 are heated by means of steam drawn from the turbine 103 through line 99. A valve 98 controlled by a pneumatically actuated operator 97 regulates the flow through line 99. A line 96 carries condensed steam which has been used in heating feed water from the heater 109 to the condenser 106. Feed water is recirculated to the reactor 100 from the feed heaters 109 through line 101.

As in the embodiment of FIGS. 1 and 1A, a by-pass line 111 is provided around the feed heaters 109 and a by-pass line 112 is provided around the turbine 103. A desuperheater 94 is provided in the line 112.

To control the system outlined under normal conditions, control rod movement with a modified Bailey control system as described in connection with FIGS. 1 and 1A is used. Since there is no steam drum in the system of FIG. 2, a level control is not used. Flow meter 113 measures the rate of steam flow through line 102 and sends a signal proportional to this flow rate through pneumatic line 114 to a control device 115. A flow meter 116 is provided in line 111 and a flow meter 117 is provided in line 101. Flow meter 116 sends a signal proportional to the rate of flow through line 111 to a totalizer relay 118 through pneumatic line 119. Flow meter 117 signals the flow rate in line 111 to the totalizer relay 118 through pneumatic line 120. The totalizer relay 118 may be of the same type used in the embodiment of FIG. 1 (e.g. Moore Model 68–1). It adds the signals from flow meters 116 and 117 and delivers a signal proportional to the combined flow through lines 101 and 111 to the control device 115 through pneumatic line 121. The control device 115 may conveniently be a Bailey Pilotrol of the type referred to above. It compares the feed water rate to the steam output rate and sends a signal proportional to departures from the normal relation between these two rates through pneumatic line 124 to a valve positioner 122 which makes an appropriate adjustment of the valve 123 in the feed water line 101. A selector 125 in the line 124 may be used for manual control of the valve 123.

A pressure control is also used in the system of FIG. 2 to compensate for minor fluctuations in the steam pressure in the line 102. The pressure control comprises a measuring device 126 which sends a signal through pneumatic line 172 to valve 128, opening or closing this valve in accordance with fluctuations in pressure.

Operation of the control rods under gradual changes of load is accomplished exactly as in the embodiment of FIG. 1. For this purpose, a transducer 89 is electrically connected via line 88 to the instrument transformer 129 which is in turn applied across the output lines 130 and 131 of the generator 104. The transducer 89 transmits a pneumatic signal via line 87 to a totalizer 86 which is in turn connected via line 85 to the control rod operator 90. Gradual changes in $Vg$ cause deviations in the voltage transmitted to transducer 89. This is reflected in the pneumatic signal sent from transducer 89 to totalizer 86 and in the signal sent to operator 90, causing the control rods 91 to be inserted or withdrawn all as explained above in connection with FIG. 1.

In accordance with the invention a further control is imposed on the system above desicribed to compensate for rapid increases or decreases in load on the generator 104. In accordance with the invention the off-take voltage from instrument transformer 129 which is proportional to the output voltage of the generator $Vg$ is transmitted from the transformer 129 to a controller 132. As in the system of FIG. 1 the controller 132 is designed to transmit, under conditions of constant input, a signal of given value to the two transducers 133 and 134. When the input to controller 132 changes, the output from the controller changes in proportion to the first derivative of the input, i.e. proportional to the rate of change with time of the input. The signal so modified is sent to the transducers. Transducer 133 is arranged so that upon the signal from controller 132 falling below a predetermined tolerance range it will send a pneumatic signal through line 135 to a valve positioner 136. The valve positioner then function to open a valve 137 in the line 111 to a degree that is proportional to the value of the signal given by the transducer 133. Opening of valve 137 permits water to be sent around the feed heaters 109 and hence lowers the temperature of the water being delivered to the reactor 100. Because of the lower temperature of the feed water and because the percentage of steam voids in the reactor is reduced, the reactivity of the reactor is increased, raising the power level of the reactor to meet the increase in load.

The signal from the transducer 135 is also transmitted via line 95 to valve positioner 97, controlling valve 98 in the line 99. The positioner 97 is arranged to close the valve 98 as the valve 137 in line 111 is opened. This cuts off the supply of steam to the feed water heaters 109, further decreasing the temperature of the feed water and temporarily making additional steam available to meet the increased demand.

As the valve 137 opens, the extent of its opening is measured by a position indicator 84 and communicated, via a line 83 to a primary totalizing relay 82. Relay 82 in turn communicates the change to totalizer 86 where it alters the signal sent to operator 90 causing the control rods to be withdrawn. Again details of this sequence are identical with that described above for FIG. 1.

Under conditions of rapidly decreasing load the voltage $Vg$ will increase, and hence, the signal from controller 132 will increase above the normal value, the amount of increase being proportional to the rate at which the generator voltage drops. If the increase in the signal from controller 132 to transducers 133 and 134 rises above a determined tolerance range, transducer 134 will send a pneumatic signal through line 138 to valve positioner 139. Positioner 139 operates the valve 140 in the line 112 to by-pass steam around the turbine 103 and dump it in line 105.

Opening of valve 140 is signalled to totalizing relay 82 by position indicator 81 via line 80, causing insertion of the control rods as indicated above in connection with FIG. 1.

Further details of operation of the system of FIG. 2 are believed obvious from the description given in connection with FIG. 1. The various components referred to in FIG. 2 may be of the same variety as those identified in connection with FIG. 1 and, indeed, the operation of the system of FIG. 2 is identical to that of FIG. 1 except for the absence of a steam drum liquid level control in FIG. 2. Control of the feed water heater steam supply is shown in FIG. 2 but not in FIG. 1. It will be understood however, that this expedient may be added to or omitted from either system as desired.

A study of the foregoing specification and claim discloses a simple and straightforward means for increasing the output of a boiling water type nuclear reactor in response to sudden increases in demand. By using the inherent properties of the reactor, applicant has been able to provide a control system which avoids secondary steam systems and which avoids dumping a part of the produced steam during normal operation.

Although the term "boiling water" is used throughout the specification as a means of identifying the particular type of power system with which the invention is concerned, it will be understood that the invention is not limited to systems in which $H_2O$ is used as the working fluid. On the contrary, the present system is applicable to any power cycle in which liquid is vaporized in a nuclear reactor and the vapor used directly to drive a heat engine.

It will further be understood that although, in the specific system described, the output of a generator is used as the basis for measuring the rate of load variation, other means may be used as seems appropriate. Thus, for example, the speed of the turbine, the change in position of the turbine governor, or the change in pressure or flow rate in the reactor output line could be used to sense a change in load on the system.

Further refinements in the system described are also possible within the scope of the invention. For example, in the force recirculation system of FIG. 1, the speed of the pump 3a and hence the rate of recirculation rather than control rod positioning may be varied with change in load as a part of the control system.

What is claimed is:

A nuclear reactor power system comprising a reactor having a mass of fissionable material for vaporizing liquid working fluid, cooling tubes in said mass, control rods adapted to be inserted in and withdrawn from said mass, means for delivering liquid working fluid to said tubes, heating means for heating said working fluid prior to its delivery to said tubes, a heat engine capable of functioning under a variable load and operated by working fluid vapor, means responsive to the rate of increase in load on said heat engine above a predetermined rate for shunting working fluid around said heating means and delivering liquid working fluid to said reactor without substantial preheating, and means for withdrawing said control rods from said reactor upon an increase in load on said heat engine.

References Cited in the file of this patent

UNITED STATES PATENTS 2,861,033    Treshow _____ Nov. 18, 1958

OTHER REFERENCES

"A Design Description of the Dresden Nuclear Power Station," publ. by General Electric Co. (paper presented at a joint session of the Nuclear Engineering and Power Divisions at the ASME Annual Meeting, New York, N.Y., November 26, 1956), pages 1, 3–6, 17–23.